United States Patent [19]

Hoppmann et al.

[11] Patent Number: 4,723,661
[45] Date of Patent: Feb. 9, 1988

[54] ROTARY PUCK CONVEYING, ACCUMULATING AND QUALIFYING MECHANISM

[75] Inventors: Kurt H. Hoppmann, Falls Church; James G. Lin, Springfield; Werner H. Schmitt, Falls Church, all of Va.

[73] Assignee: Hoppmann Corporation, Chantilly, Va.

[21] Appl. No.: 880,747

[22] Filed: Jul. 1, 1986

[51] Int. Cl.⁴ .............. B07C 9/00; B65G 29/00; B65G 47/34
[52] U.S. Cl. ............... 209/658; 198/479.1; 198/580; 198/608; 198/803.15; 209/922; 209/940
[58] Field of Search ......... 209/656, 658, 915, 922, 209/940; 198/450, 465.2, 479.1, 576, 580, 608, 803.01, 803.15

[56] References Cited

U.S. PATENT DOCUMENTS

| | | | |
|---|---|---|---|
| 2,358,315 | 9/1944 | Campbell | 198/479.1 |
| 2,987,180 | 6/1961 | Shields | 209/658 X |
| 3,033,346 | 5/1962 | Gardiner | 198/608 X |
| 3,090,478 | 5/1963 | Stanley | 198/803.15 X |
| 3,253,739 | 5/1966 | Martin | 198/803.15 X |
| 3,342,304 | 9/1967 | Greulich | . |
| 3,384,235 | 5/1968 | Schulze et al. | 209/658 X |
| 3,410,406 | 11/1968 | Tsuda et al. | 198/465.2 X |
| 3,941,237 | 3/1976 | MacGregor, Jr. | 198/803.01 |
| 3,976,187 | 8/1976 | Szpitalak | 198/479.1 |
| 3,978,968 | 9/1976 | Rose et al. | 198/608 X |
| 4,013,164 | 3/1977 | Reilly | . |
| 4,033,450 | 7/1977 | Paddock et al. | . |
| 4,142,706 | 3/1979 | Mueller | 198/803.15 X |
| 4,189,996 | 2/1980 | Ackley, Sr. et al. | . |
| 4,274,532 | 6/1981 | Johnson | 198/580 X |
| 4,305,496 | 12/1981 | Hoppmann et al. | 198/450 X |

Primary Examiner—Robert B. Reeves
Assistant Examiner—Edward M. Wacyra
Attorney, Agent, or Firm—Birch, Stewart, Kolasch & Birch

[57] ABSTRACT

A rotary puck conveying, accumulating and qualifying mechanism for accommodating articles of various sizes. A puck is provided having a predetermined outer peripheral surface and including an article retaining aperture disposed therein. The article retaining aperture being of a predetermined shape for accommodating an outer peripheral surface of an article being handled. A centrifugal feeder is provided for supplying a plurality of articles to an outer peripheral rim. A rotating table accumulates the pucks in both a full and an empty condition. The rotating table is operatively disposed beneath the centrifugal feeder wherein outer peripheral surfaces of the centrifugal feeder and the rotating table overlap. A plurality of pockets are rotatably disposed below the centrifugal feeder for engaging pucks positioned on the rotating table for retaining the pucks in a predetermined location relative to the centrifugal feeder for supplying articles into the aperture in the puck over an extended length of transfer. A qualifying doctor blade is operatively positioned relative to the rotating table for separating the pucks which contain an article from empty pucks. The full pucks are transported to a predetermined location while the empty pucks are returned to the rotating table for resupply to the pockets for receiving an article to be processed.

5 Claims, 6 Drawing Figures

ROTARY PUCK CONVEYING, ACCUMULATING AND QUALIFYING MECHANISM

BACKGROUND OF THE INVENTION

1. Field of the Invention

The present invention relates to a puck feeding system wherein a single rotating table may be used to qualify, accumulate and load the pucks with a predetermined article.

2. Description of Background Art

Centrifugal feeding devices are available for accumulating a quantity of articles and centrifugally supplying the articles to an outer peripheral edge. The supplied articles are thereafter delivered to a conveyor or work station for processing the articles. However, articles fed into a centrifugal feeder can be a plurality of different sizes and shapes which make it extremely difficult to design a standardized centrifugal feeder to accommodate the distinct articles to be sorted. Thus, it has been necessary to design separate centrifugal feeders to sort distinct articles which may have a particular shape or may be configured so that it requires special adaptation of the centrifugal feeding device so as to permit the special articles to be sorted.

Centrifugal feeders attempt to convey articles so that 100 percent efficiency is achieved. However, often an article will not be positioned at the correct location adjacent to the outer peripheral edge of the centrifugal feeder and thus the supply of articles to the conveyor or work station will not be at 100 percent efficiency. The present invention qualifies, accumulates and loads articles into a puck so that 100 percent efficiency is achieved.

SUMMARY AND OBJECTS OF THE INVENTION

It is an object of the present invention to supply articles to an empty puck so that 100 percent efficiency of articles within an aperture in the puck is achieved.

Another object of the present invention is to provide a rotating table which will qualify, accumulate and load articles into a puck.

A further object of the present invention is to provide an articles loading conveyor wherein a centrifugal feeder is positioned adjacent to a rotating table so that a line contact is achieved for permitting a plurality of articles to be located within an equal plurality of pucks at a single time.

Another object of the present invention is to provide a puck feeding system wherein standardized equipment may be utilized to supply articles of distinct shapes and sizes to pucks having corresponding distinct shapes and sizes of apertures disposed therein to accommodate the distinct articles.

Still another object of the present invention is to provide a puck feeding device wherein the rotating table may be moved intermittently without affecting the qualifying of the article within the puck.

A still further object of the present invention is to provide a puck feeding device wherein the pucks are disposed on the rotating table so as to be easily removed therefrom.

These and other objects of the present invention are achieved by providing a centrifugal feeding device which will accumulate a supply of articles and position the articles along an outer rotating rim. A rotating table is disposed adjacent to the centrifugal feeding device so as to provide a mutually overlapping path wherein articles disposed on the outer rotating rim of the centrifugal feeder may be supplied to an aperture in the puck. The centrifugal feeding device includes an outer rotating rim having pockets for positioning the pucks in a predetermined location so as to provide a specified line contact between the centrifugal feeding device and the rotating table so that articles may be positioned within the aperture in the puck along that specified line. The rotating table includes a qualifying device which will direct the articles disposed within a puck to a predetermined location so as to separate empty pucks from pucks containing articles. The present invention provides a device wherein either a single rotating table or a conveyor arrangement may be utilized for qualifying, accumulating and loading pucks with a specified article.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
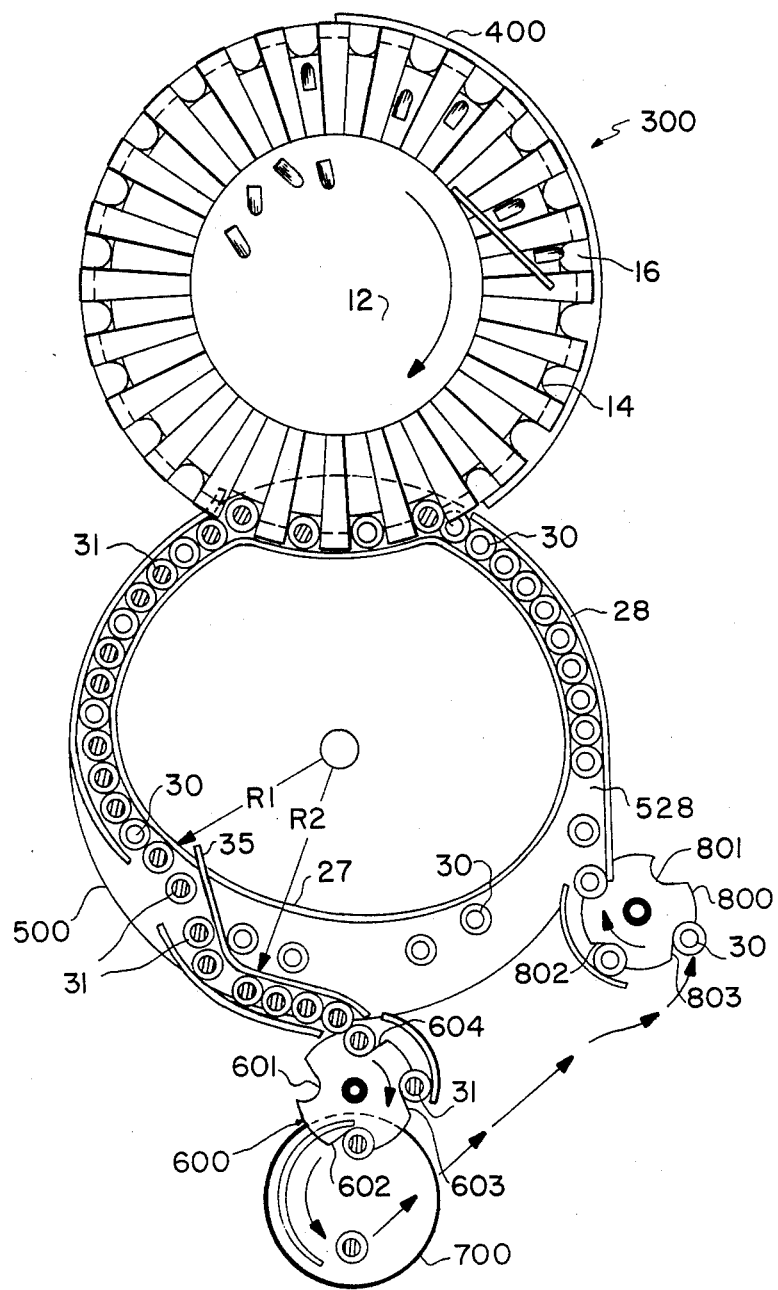
FIG. 1 is a top plan view illustrating a centrifugal article feeding device disposed adjacent to a rotating table and a work station.
Figure 2:
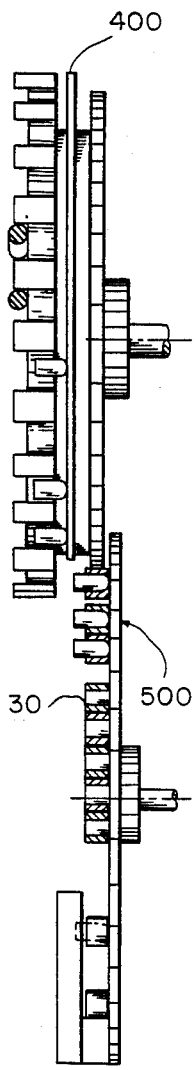
FIG. 2 is a side elevational view illustrating the centrifugal feeder disposed above and adjacent to the rotating table.
Figure 3:
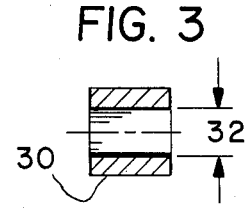
FIG. 3 is a cross-sectional view of a puck with or without a through hole used together with the centrifugal article feeding device.

FIGS. 1 and 2 are to be considered together. FIG. 1 is a top plan view of a centrifugal article feeding device 300 positioned above and adjacent to a rotating table 500. The positioning of the centrifugal article feeder 300 relative to the rotating table 500 is more clearly illustrated in FIG. 2.

Figure 4:
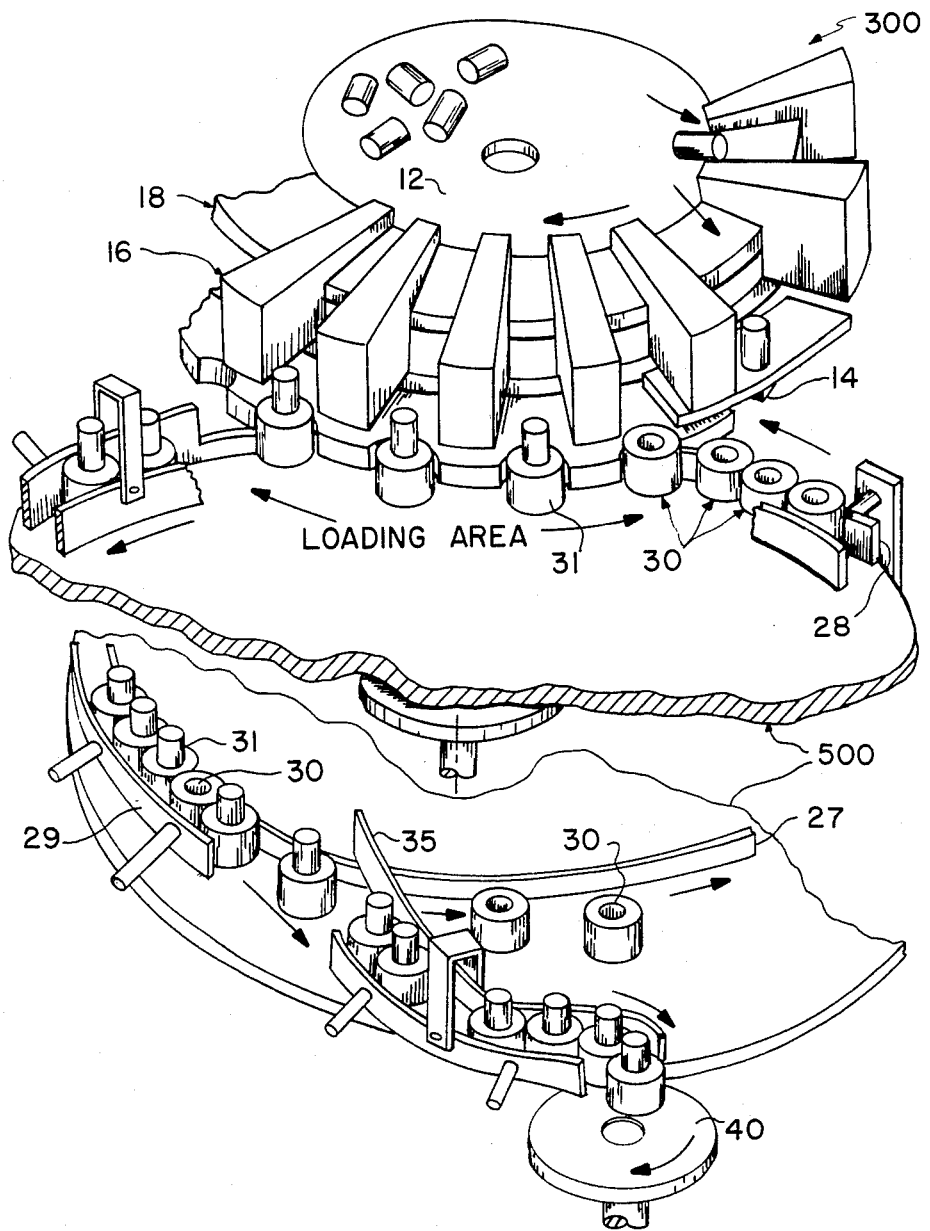
FIG. 4 is a partial cutaway perspective view of the centrifugal article feeding device supplying articles to the rotating table for subsequent supply of articles to a work station.

As shown in FIG. 4, the centrifugal feeder 300 includes a rotating accumulating table 12 and a rotating outer rim 18. Articles are supplied to the rotating accumulating table 12 and are centrifugally fed outwardly to the outer rotating rim. The articles on the rotating outer rim 18 are oriented so as to be in the right disposition for supplying the articles to empty pucks 30. An outer rim guide 28 is provided for retaining the empty pucks on the outer rim of the rotating table 500 so as to supply the empty pucks 30 to a point adjacent to the centrifugal feeder 300. The centrifugal feeder 300 includes pockets 14 which are disposed at a lower level relative to the rotating outer rim 18. As illustrated in FIG. 4, the rotating outer rim 18 is disposed above a delivery chute 16. Both the rotating outer rim 18 and the delivery chute 16 are at a higher elevation relative to the pockets 14.

The rotating table 500 is provided with an inner lane guide 27 and the outer rim guide 28. A portion 29 of the outer rim guide 28 is provided to direct pucks which are filled with an article towards the inner lane guide 27. A qualifying doctor blade 35 is provided for redirecting pucks filled with an article back towards the outer lane guide 28. As the rotating table 500 continues along its rotational path, a take away turret 40 is provided for removing pucks filled with an article from the rotating table 500 so as to supply the pucks and the articles to an assembly or work station. The article is thereafter processed and empty pucks are returned to the outer lane 28 by means of a return conveyor.

The centrifugal feeder 300 and the rotating table 500 are synchronized relative to each other so that the rotation of the pockets 14 correspond with the supply of empty pucks 30. The pockets 14 may be incrementally advanced so as to incrementally engage a single empty puck 30 by the next available empty pocket 14. In the alternative, the pocket 14 may be continuously rotated so as to continuously engage an empty puck 30 with a corresponding pocket 14.

As illustrated in FIGS. 1 and 4, the articles which are qualified and positioned on the rotating outer rim 18 are supplied through the delivery chute 16 towards the pocket 14. An empty puck 30 is disposed within the pocket 14 so as to permit the article to be received within an aperture 32 positioned centrally with respect to the puck 30. Thereafter, the article is engaged within the aperture 32 and the full pucks 31 continue along towards the portion 29 of the outer rim guide 28. The full pucks 31 and the empty pucks 30 are transferred by the portion 29 towards the inner lane guide 27. Thereafter, the qualifying doctor blade 35 redirects the full pucks towards the outer lane 28. The empty pucks 30 continue along the inner lane 27 to be resupplied to an area 528 defined between the outer rim guide 28 and the inner lane guide 27 and eventually resupplied back to the empty pockets 14.

As illustrated in FIG. 1, the full pucks may be supplied to a turret 600. The turret 600 includes pockets 601, 602, 603 and 604. Full pucks are supplied from the rotating table 500 to the pockets 601-604 so that the pucks can be conveyed to a work area 700 for assembly, printing, inspection, etc. The finished products are conveyed along a conveyor to an area where the finished products may be packaged. The empty pucks 30 are transported to a transfer wheel 800 which includes pockets 801, 802 and 803. The empty pucks 30 are resupplied back to the rotating table 500.

Figure 5:
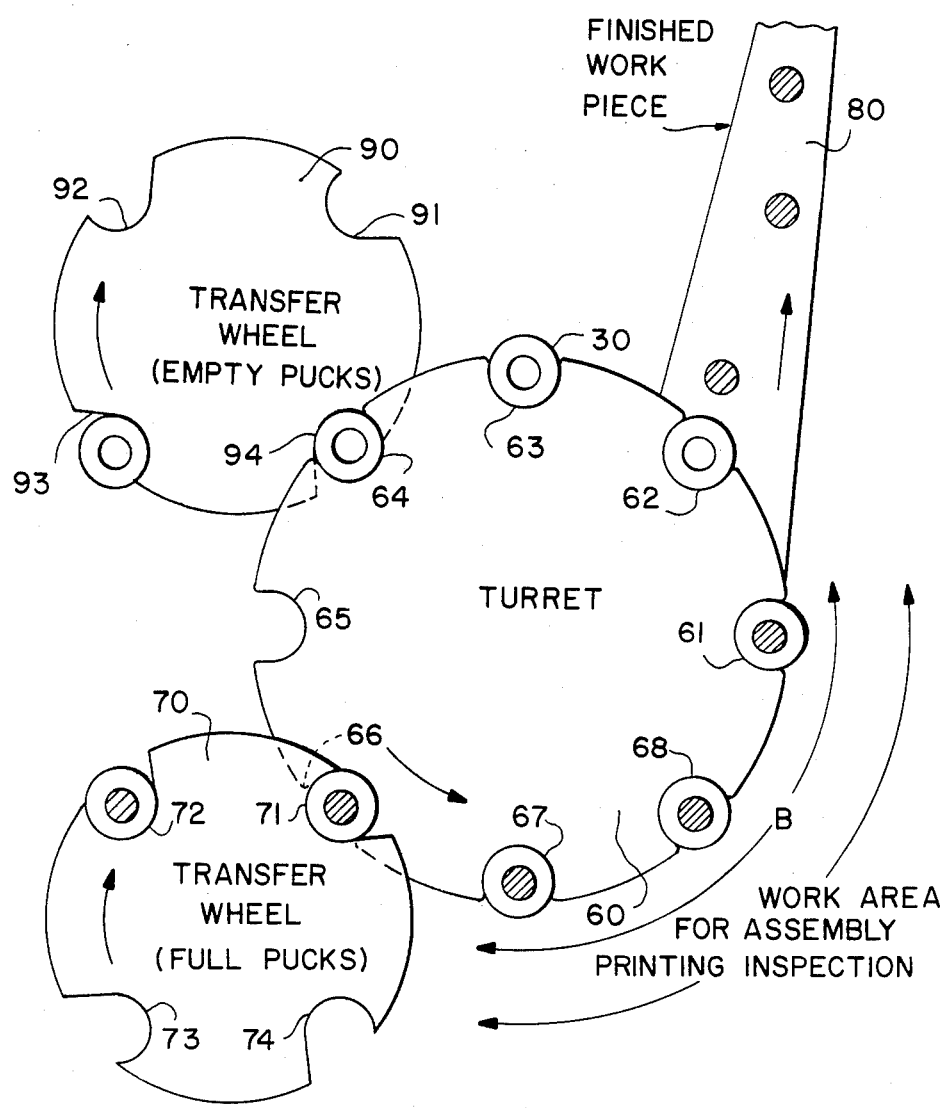
FIG. 5 is a top plan view illustrating another embodiment of the present invention wherein the pucks filled with articles are supplied to a work station.

Another embodiment of supplying full pucks to a work station is illustrated in FIG. 5. Initially, full pucks are supplied to a transfer wheel 70 having a plurality of pockets 71, 72, 73 and 74. The transfer wheel 70 supplies full pucks to a turret 60 having a plurality of pockets 61, 62, 63, 64, 65, 66, 67 and 68. In a work area B, the articles positioned within the aperture in the puck will undergo a finishing step such as an assembly, printing or inspection step. Thereafter, the finished workpieces are supplied to a conveyor 80 for delivery to an area where the finished products may be packaged. The empty pucks 30 are transported to a transfer wheel 90 having a plurality of pockets 91, 92, 93 and 94. The empty pucks 30 are resupplied back to the rotating table 500.

Figure 6:
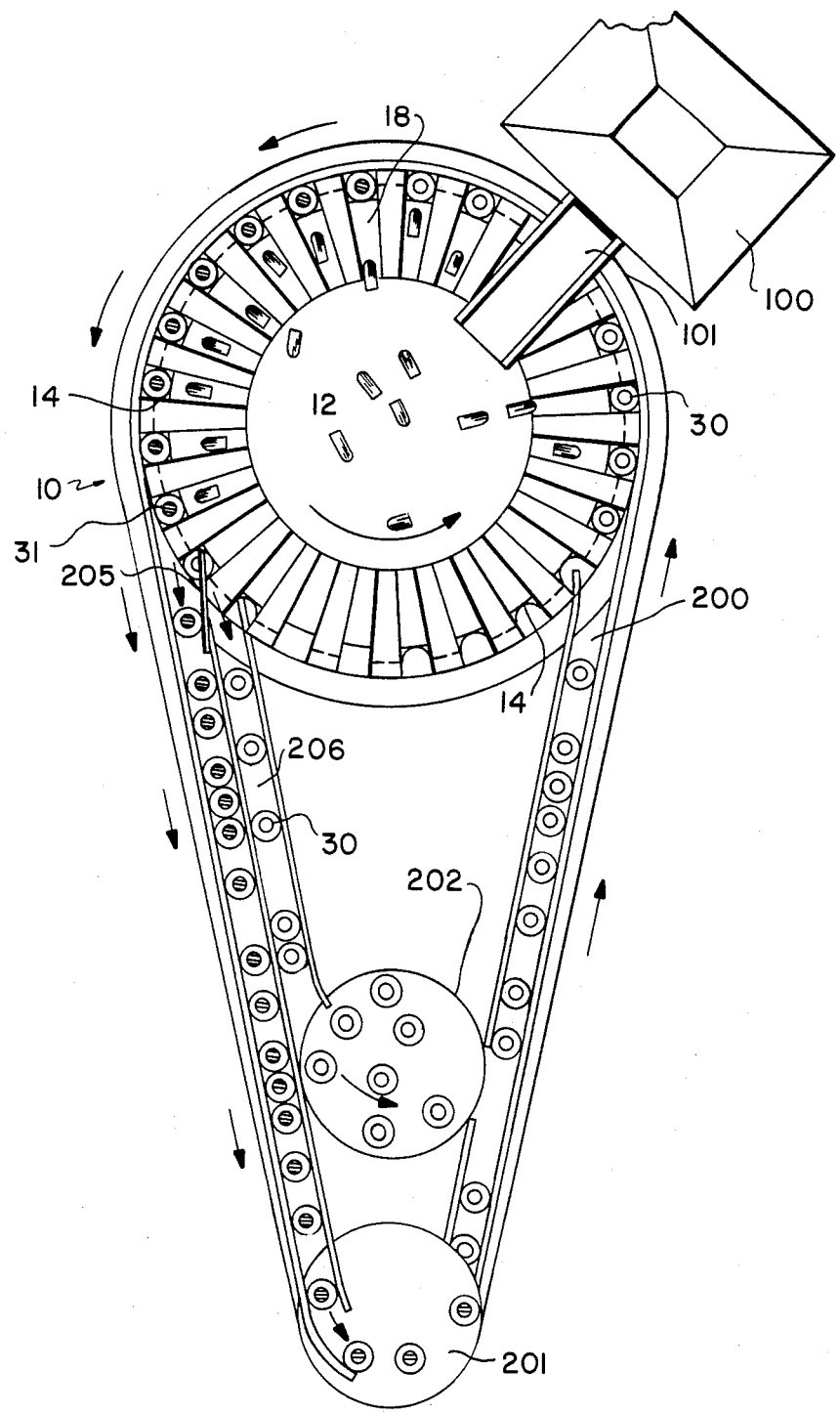
FIG. 6 is another embodiment of the present invention wherein a centrifugal feeder is utilized together with a conveyor to ensure 100 percent supply of articles disposed within a puck.

In another embodiment of the present invention as illustrated in FIG. 6, a centrifugal feeder 10 is supplied with articles from a hopper 100. The embodiment of the present invention as illustrated in FIG. 1 may also include a hopper, not illustrated, for supplying articles to the rotating accumulating table 12.

As illustrated in FIG. 6, the articles within the hopper 100 are transported down the chute 101 onto the rotating accumulating table 12. The articles are thereafter centrifugally supplied to the rotating outer rim 18. The articles on the outer rotating rim 18 are qualified so as to be in the proper orientation. Pockets 14 are provided for engaging the empty pucks 30 supplied along a conveyor 200. The conveyor 200 is a conveyor of indeterminate length which is provided below the centrifugal feeder 10. Articles which are disposed on the rotating outer rim 18 will be supplied downwardly from the outer rotating rim 18 to an aperture 32 in the pucks 30 which are held in position by means of the pockets 14. The conveyor 200 disengages from the centrifugal feeder 10 to convey the full pucks 31 to a work station. A pulley 201 is provided for redirecting the conveyor 200 back towards the centrifugal feeder 10. A rotating accumulation table 202 is provided for receiving the empty pucks 30 and redirecting the empty pucks back onto the conveyor 200.

As illustrated in FIG. 6, a qualifier 205 is provided for separating the full pucks 31 from the empty pucks 30. The full pucks 31 are directed onto the conveyor 200 to be supplied to an assembly station or work station. The pulley 201 is operatively positioned relative to the conveyor belt 200 so as to turn the conveyor belt and redirect the empty pucks towards the centrifugal feeder 10.

The empty pucks 30 are directed along the conveyor 206 and are directed to the accumulation table 202. The empty pucks 30 are thereafter supplied onto the conveyor 200 and returned to be filled with an article supplied by the centrifugal feeder.

The assembly illustrated in FIG. 6 ensures that 100 percent of the pucks conveyed along the conveyor 200 from the centrifugal feeder are filled with articles. In addition, in view of the fact that an extremely long path is available along the outer peripheral surface of the centrifugal feeder 10 for receiving articles, articles sorted by the feeder have a substantial time period in which to fall into an aperture in one of the empty pucks 30.

As illustrated in FIGS. 2 and 4, an article is oriented between the scallops or pockets 14 and is supplied to be positioned on the stationary shelf 400. The stationary shelf 400 is provided above the rotating table 500. The articles disposed within the feeder 300 are oriented between the scallops or pockets 14 along a loading area as illustrated in FIG. 4. Thereafter, the articles drop from the stationary shelf 400 into one of the empty pucks 30. The full and empty pucks are conveyed around the rotating table 500 to a qualifier 35. The qualifier 35 deflects the filled pucks to the outer peripheral surface of the rotating table 500. Empty pucks are permitted to pass beneath the qualifier 35 so as to be returned to the accumulating lane 528.

The pucks 30 may be constructed of a plastic material with a predetermined outer circumferential surface. The outer surface of the pucks 30 may be any predetermined size or shape which will mate with the pockets in the cooperating turrets. A flat spot may be positioned on the puck 30 so as to orient the puck in a predetermined disposition as the puck travels along an assembly line. In addition, a bar coating may be disposed on the puck so that the particular puck and article can be followed electronically, through an assembly operation.

The aperture 32 positioned in the puck 30 may be any predetermined size. The size of the aperture is designed to mate with the particular shape and size of the article which is supplied to the centrifugal feeder. Thus, a single puck having a predetermined outer surface may be used to sort and handle a plurality of distinct articles by merely changing the interior aperture 32 disposed within the puck 30. The aperture 32 may be square, rectangular, hexagon, circular, or any other shape which will mate with the corresponding shape of the article being sorted.

By designing the puck to have a predetermined outer circumferential surface, the present invention permits a standardized centrifugal feeder and rotating table to be used together with the sorting, accumulating and qualifying of a plurality of distinct articles. In this way, the expense involved with specially designing equipment to handle particular shaped articles and articles of a particular size is obviated. In addition, the puck 30 may have an aperture 32 which extends completely through the articles. In this way, the article may be withdrawn from the system by merely moving the puck over an empty space so that the article falls therefrom.

As illustrated in FIG. 1, the rotating table 500 includes a guide member 27. The guide member 27 provides the pucks with a predetermined path which they follow as they are conveyed around the rotating table 500. The qualifier 35 is disposed at two radiuses from the center portion of the rotating table 500. The radius R1 determines the distance between the center of the rotating table 500 and the initial point where the qualifier 35 will permit the empty pucks 30 to pass thereunder. The radius R2 determines the point along the rotating table 500 wherein the full pucks 31 are transported on the rotating table 500 and onto the turret 600.

The present invention permits the construction of a combination centrifugal feeder and rotating table wherein a substantially long path is provided for transferring articles sorted on the centrifugal feeder to the pucks 30 which are disposed on the rotating table. In this way, a number of articles may be positioned into corresponding pucks at a single time. Further, by providing a line contact the rotary puck conveying, accumulating and qualifying mechanism ensures that 100 percent of the pucks are filled as they are conveyed along the system. In addition, one table may be used to qualify, accumulate and load the pucks. This is quite an improvement over prior art mechanisms which require special fingers for grabbing the pucks. Further, less pucks are necessary in view of the fact that the empty pucks are returned to the rotating table after the article has passed the work station or assembly station. The pucks are easily accessible so that an individual may remove certain pucks from the system at any particular time. The pucks are not locked into the system so that they cannot be removed as is required in prior art devices.

The present invention may be rotated intermittently without affecting the qualifying of the device. The centrifugal feeder may be disposed adjacent to the rotating table so that the rotating table intermittently accepts articles. The device may be used to inspect articles and to key articles so that they are at a predetermined disposition relative to a work station or assembly point.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

We claim:

1. A rotary puck conveying, accumulating and qualifying mechanism for accommodating articles of various sizes comprising:

a plurality of pucks, each puck having a predetermined outer peripheral surface and including an article retaining aperture disposed therein, said article retaining aperture being of a predetermined shape for accommodating an outer peripheral surface of an article being handled;

a centrifugal feeder for supplying a plurality of singulated articles to an outer peripheral rim;

a rotating table for accumulating said pucks in both an article containing and an empty condition, said rotating table being operatively disposed beneath said centrifugal feeder wherein outer peripheral surfaces of said centrifugal feeder and said rotating table overlap at least in an article transfer region;

a plurality of pockets rotatably disposed below said centrifugal feeder for engaging individual pucks positioned on said rotating table for retaining said pucks in a predetermined location relative to said centrifugal feeder for supplying said singulated articles into said aperture in said individual puck over an extended length of said transfer region; and a qualifying doctor blade operatively positioned relative to said rotating table for separating said article containing pucks from empty pucks, said article containing pucks being transported to a predetermined location displaced relative to said rotating table while said empty pucks are retained at said rotating table for resupply to said pockets for receiving an article.

2. A rotary puck conveying, accumulating and qualifying device as set forth in claim 1, wherein said centrifugal feeder includes an outer rotating rim and said plurality of pockets are mounted on a rotating support having a diameter which corresponds to the diameter of said outer rotating rim of said centrifugal feeder, said pucks on said rotating table are individually retained by said pockets to follow the path of said outer rotating rim for a predetermined distance of said transfer region so that articles disposed on said outer rotating rim are supplied to a delivery chute for directing said singulated articles into the aperture in a corresponding puck.

3. A rotary puck conveying, accumulating and qualifying device as set forth in claim 1, and further including a wiper for displacing both said empty and article containing pucks toward an inner rotating rim of said rotating table initially prior to said qualifying doctor blade displacing said article containing pucks relative to said rotating table.

4. A rotary puck conveying, accumulating and qualifying device according to claim 1, wherein said rotating table is intermittently rotated for intermittently feeding said article containing pucks to said predetermined location displaced relative to said rotating table.

5. A rotary puck conveying, accumulating and qualifying device for accommodating articles of various sizes comprising:
- a plurality of pucks, each puck having a predetermined outer peripheral surface and including an article retaining aperture disposed therein, said article retaining aperture being of a predetermined shape for accommodating an outer peripheral surface of an article being handled;
- a centrifugal feeder for supplying a plurality of singulated articles to an outer peripheral rim;
- a rotating conveyor for accumulating said pucks in both an article containing and an empty condition, said rotating conveyor being operatively disposed beneath said centrifugal feeder wherein the outer peripheral surface of said centrifugal feeder and said rotating conveyor overlap at least in an article transfer region;
- a plurality of pockets rotatably disposed below said centrifugal feeder for engaging individual pucks positioned on said rotating conveyor for retaining said pucks in a predetermined location relative to said centrifugal feeder for supplying articles into said aperture in said individual puck over an extended length of said transfer region; and
- a qualifying doctor blade operatively positioned relative to said rotating conveyor for separating said article containing pucks from empty pucks, said article containing pucks being transported to a predetermined location displaced relative to said rotating conveyor while said empty pucks are returned to said rotating conveyor for resupply to said pockets for receiving an article.

* * * * *